H. O. PEABODY.
Breech-Loading Fire-Arm.
No. 2,197. Reissued Mar. 13, 1866.
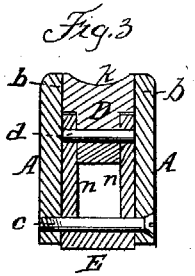
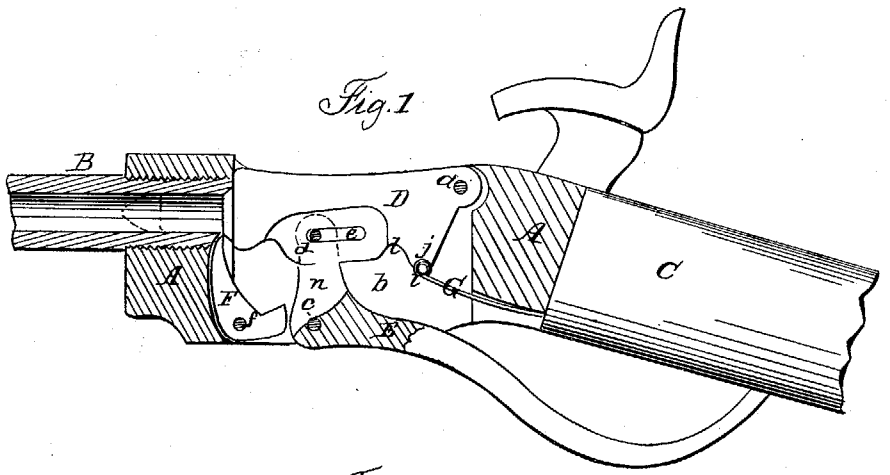
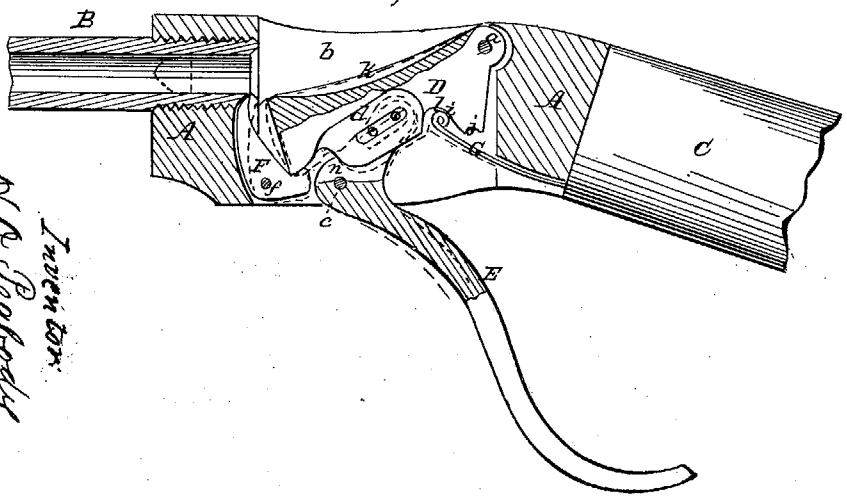
Witnesses:
J. W. Coombs
Geo Reed
Inventor:
H O Peabody
per Munn & Co
Attys
N. PETERS, PHOTO-LITHOGRAPHER, WASHINGTON, D. C.

UNITED STATES PATENT OFFICE.

H. O. PEABODY, OF BOSTON, MASSACHUSETTS.

IMPROVEMENT IN BREECH-LOADING FIRE-ARMS.

Specification forming part of Letters Patent No. 35,947, dated July 22, 1862; Reissue No. 2,197, dated March 13, 1866.

*To all whom it may concern:*

Be it known that I, H. O. PEABODY, of Boston, in the county of Suffolk and State of Massachusetts, have invented certain new and useful Improvements in Breech-Loading Fire-Arms; and I do hereby declare that the following specification, taken in connection with the drawings making a part of the same, is a full, clear, and exact description thereof.

Figures 1 and 2 are central longitudinal vertical sections of the breech part of the fire-arm constructed according to my invention, showing the breech in different positions. Fig. 3 is a transverse section of the same.

My invention relates to that class of breech-loading fire-arms in which the rear end of the barrel can be alternately opened and closed by the movement of a breech-block which swings upon a hinge within a mortise in the frame connecting the stock with the barrel, and is operated by means of the trigger-guard as a lever. Its distinctive peculiarities consist in, first, a combination of devices for imparting a movement to the breech-block, whereby the piece can be brought into the position for loading by a much smaller extent of movement of the guard-lever than in any other fire-arm of its class, and the whole movement of the breech-block be performed within the frame which connects the stock with the barrel; second, in the simplicity and effectiveness of the combination of devices for ejecting the exploded cartridge-shell, and in the facility with which the same can be done cotemporaneously with the opening of the chamber preparatory to reloading; third, in the means for holding the breech-piece in its respective positions for loading or firing, and also for causing it to be automatically returned, after aiding in ejecting the empty shell, to a position at which a groove upon its upper surface shall coincide with the bore of the chamber to facilitate the insertion of another cartridge.

In the accompanying drawings, A is the metal breech-frame which unites the barrel B with the stock C, and which has provided within it a mortise or parallel-sided opening, *b b*, for the reception of the swinging breech-block D, which is secured therein by a pin, *a*, upon which it turns, passing through the upper part of the rear end of the block and through the sides of the frame A.

E is the trigger-guard lever for operating the breech-block. It has a long arm serving as a trigger-guard, and a short arm connected with the breech-block, and is hung at the angle upon a fulcrum-pin, *c*, inserted through the lower part of the frame. The short arm is forked, so as to embrace the breech-block, as shown at *n n*, Fig. 3. In the instance shown in the drawings the forked portion of the guard-lever is connected with the breech-block by means of a pin, *d*, which passes through holes near the end of the forks, as well as through a long slot, *e*, in the breech-block, the width of which slot is the same as the diameter of the pin and of a ring which surrounds the portion in the slot, serving the purpose of a friction-roller.

It is obvious that as the guard-lever is moved downward the pin *d* will describe the arc of a circle, and will, as it travels along the slot, compel the breech-block to turn upon its hinge *a*, thereby uncovering the rear end of the barrel. By bringing back the guard-lever to the first position the end of the breech-block which has been depressed will, by the movement of the pin *d* over the same arc in returning, be made to rise and close the end of the barrel. It will be seen that this method of operating the breech-block possesses the advantage of a small extent of movement on the part of the guard, as compared with most breech-loaders of this class, combined with great simplicity of action.

Although I have shown in the present instance the pin of the guard-lever working in a slot in the breech-block, I wish it to be distinctly understood that this form of arrangement is but one of many which may be employed embodying the same principle—as, for example, a long notch could be cut in the lower side of the block and the end of the short arm of the guard-lever be fitted to work therein, so that as the guard-lever is moved upward or downward the end of the arm will ride along the surfaces of the notch and operate the block in the same manner as in the case particularly shown, the notch in effect being a slot open at one end.

Another feature of my invention consists in the device for ejecting the exploded cartridge-shell, in combination with a positive movement of the breech-block in the same direction as that which it makes when being brought to the position for loading. The rear end of the bore of the barrel is countersunk for the reception of the flange which surrounds the base of the metallic cartridge.

F is an elbow-lever of steel, arranged to work in a mortise provided for it in the breech-frame below the barrel, on a fulcrum-pin, *f*. The arms of this lever are of an equal length. The longer and upright arm, when the cartridge is properly inserted in the bore, bears at its extremity against the flange of the cartridge, the rear of the barrel underneath the cartridge being recessed to accommodate the arm in this position. The shorter arm stands at about a right angle with the other, and when the arm is in position for firing is disconnected with any other part. If, however, the guard-lever is brought down, so as to bring the breech-piece to the position for loading, as heretofore explained, and its movement continued in the same direction for a short distance farther, the breech-piece will strike against the shorter arm of the lever F, and as the latter is free to turn upon its fulcrum *f* the longer arm in front of the flange will be thrown backward and the exploded shell be withdrawn.

It will be observed that the arm can be brought to the position for loading without influencing the elbow-lever at all, inasmuch as the breech-piece must be carried lower than its proper relation to the barrel at the time of loading to be brought into contact with the short arm of F; but as in practice it will be desirable to remove an exploded shell simultaneously with the opening of the breech, the guard-lever should be brought down with sufficient force and to an extent to enable the breech-block to strike a smart blow upon the shorter arm of the elbow-lever F, and thus impart through the still quicker movement of the end of the longer arm an impulse to the empty shell which will eject it at once from the chamber into the air.

Another feature of my invention consists in the means for holding the breech-piece in its respective positions for loading or firing, and also for causing it to be automatically returned, after aiding in ejecting the empty shell, to a position at which a groove upon its upper surface shall coincide with the bore of the chamber to facilitate the insertion of another cartridge. These objects are accomplished by means of a spring-bar, G, in combination with notches *j* and *l* and a friction-roller, *i*, so arranged with reference to each other that the roller shall by the tension of the spring be allowed to enter the one or the other of these notches, and while in either of the same hold the breech-block in the position due to the location of such notch. Thus in the particular arrangement of these devices shown in the drawings, when the roller *i* is in the notch *j*, the breech-piece will be held in the position for firing, and when by the action of the guard-lever the breech-piece is depressed, as shown in Fig. 2, the roller *i* will be in the notch *l* and the breech-block will be held in the position for loading. The same spring, G, causes the breech-block to return to the position for loading after the latter has been further depressed, so as to act upon the elbow-lever F to eject the cartridge-shell, and thereby allow the surface of the groove *k* in the breech-block to correspond precisely with the bore to facilitate the insertion of the next cartridge, from the fact that there is no notch to hold the block in the last-named position; but, on the contrary, the roller is at this time pressing against the side of the notch *l*, as upon an inclined plane, so that the tendency of the spring is to cause the block to rise until the roller is seated in the deepest part of the notch.

Other methods of arranging the spring-bar, the roller, and the notches so as to accomplish the same results without altering at all the principles employed can be readily imagined—as, for instance, the spring-bar, instead of being provided with a roller, may, instead thereof, be provided with notches, and may be attached to the under side of the breech-piece, and the roller, instead of being attached to the breech-piece, may be attached to the breech-frame. This arrangement would be obviously the reverse only of the one shown in the drawings, and requires no special description.

As already incidentally stated, the top surface of the breech-piece D is formed with a tapering groove, *k*. When the piece is in position for loading, the surface of the groove will correspond with that of the bore, and the cartridge, when placed in the groove, will slide naturally into its place in the chamber. This feature is practically of great importance in diminishing the chances of dropping a cartridge in attempting to load when the fingers are benumbed with cold, which is a serious cause of complaint against the Burnside, as well as many other varieties of breech-loading carbines.

What I claim as my invention, and desire to secure by Letters Patent, is—

1. The combination of a swinging breech-block, D, hinged at the rear end, with the trigger-guard lever E, by means of a pin-and-slot connection, operating substantially as described, for the purpose specified.

2. The combination of a swinging breech-block, D, hinged at the rear end, with the retractor F, for the purpose of ejecting the discharged cartridge-case by a continued movement of the guard-lever in the same direction which it makes to bring the piece to the position for loading, substantially as described.

3. Holding the breech-piece at its respective positions for loading and firing by the use of the notches *j* and *l*, in combination with the spring G and roller *i*, operating in the manner substantially as described.

4. Causing the swinging breech-block D, when in the manipulation of the arm it has been made to operate upon the retractor F to eject the cartridge-shell, to be returned to such position that its top surface, *k*, shall coincide with the surface of the bore of the chamber, for the purpose of facilitating the introduction of a fresh cartridge by the means substantially as described.

H. O. PEABODY.

Witnesses:
DANIEL SHARP,
HENRY D. SMITH.